US012647008B2

(12) United States Patent
Sasaki et al.

(10) Patent No.: US 12,647,008 B2
(45) Date of Patent: Jun. 2, 2026

(54) ROTARY ELECTRIC MACHINE

(71) Applicant: NIDEC CORPORATION, Kyoto (JP)

(72) Inventors: Ryoma Sasaki, Kyoto (JP); Kentaro Hirose, Kyoto (JP); Shigeru Maeda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 247 days.

(21) Appl. No.: 18/694,991

(22) PCT Filed: Jun. 17, 2022

(86) PCT No.: PCT/JP2022/024247
§ 371 (c)(1),
(2) Date: Mar. 25, 2024

(87) PCT Pub. No.: WO2023/053599
PCT Pub. Date: Apr. 6, 2023

(65) Prior Publication Data
US 2024/0396416 A1 Nov. 28, 2024

(30) Foreign Application Priority Data
Sep. 30, 2021 (JP) ................................. 2021-161155

(51) Int. Cl.
*H02K 21/02* (2006.01)
*H02K 7/09* (2006.01)

(52) U.S. Cl.
CPC ............. *H02K 21/024* (2013.01); *H02K 7/09* (2013.01); *H02K 2213/09* (2013.01)

(58) Field of Classification Search
CPC ............. F16C 32/0489; F16C 32/0465; F16C 32/0459; F16C 32/04; H02K 7/09;
(Continued)

(56) References Cited

U.S. PATENT DOCUMENTS 4,180,946 A * 1/1980 Heijkenskjold .......... B23Q 5/10
451/24
6,121,704 A * 9/2000 Fukuyama .......... F16C 32/0489
310/90.5
(Continued)

FOREIGN PATENT DOCUMENTS

JP S58041035 U 3/1983
JP H08298745 A 11/1996
(Continued)

OTHER PUBLICATIONS

International Search Report in PCT/JP2022/024247, mailed Aug. 16, 2022. 5pp.

*Primary Examiner* — Leda T Pham
(74) *Attorney, Agent, or Firm* — HAUPTMAN HAM, LLP

(57) ABSTRACT

A rotary electric machine includes: a rotor having a shaft extending in an axial direction and rotor magnets arranged along a circumferential direction; a stator having a coil and surrounding the rotor; a housing supporting the stator; a pair of magnetic bearings on opposite sides in the axial direction of the rotor magnet; and a position adjusting member held by the housing. The stator holds the rotor rotatably in the axial direction by a field current flowing through the coil. The magnetic bearing includes a cylindrical inner magnet fixed to the rotor and a cylindrical outer magnet fixed to the housing and surrounding the inner magnet, and holds the rotor rotatably in the radial direction. The rotor has a stepped surface facing the axial direction. The position adjusting member has an opposing surface facing the stepped surface, and is movable in the axial direction with respect to the housing.

7 Claims, 2 Drawing Sheets

(58) Field of Classification Search
CPC ..... H02K 21/024; F16D 48/064; F16D 28/00;
F16H 48/11; F16H 48/10; F16H 48/08;
F16H 48/30; F16H 48/26; F16H 48/34;
F16H 48/22; F16H 48/05; B60K 23/0808;
B60K 17/3467; B60K 23/04
See application file for complete search history.

(56) References Cited

U.S. PATENT DOCUMENTS

| | | | |
|---|---|---|---|
| 7,919,947 B2 | 4/2011 | Balboul | |
| 2014/0232226 A1 | 8/2014 | Lantto et al. | |

FOREIGN PATENT DOCUMENTS

| | | | |
|---|---|---|---|
| JP | 2010115101 A | 5/2010 | |
| JP | 2014121098 A | 6/2014 | |
| JP | 2015171165 A | 9/2015 | |

* cited by examiner

ROTARY ELECTRIC MACHINE

CROSS-REFERENCE TO RELATED APPLICATIONS

This is the U.S. national stage of application No. PCT/JP2022/024247, filed on Jun. 17, 2022, and priority under 35 U.S.C. § 119(a) and 35 U.S.C. § 365(b) is claimed from Japanese Patent Application No. 2021-161155, filed on Sep. 30, 2021.

TECHNICAL FIELD

The present invention relates to a rotary electric machine.

BACKGROUND ART

Conventionally, a bearing-less motor floating by a magnetic bearing has been known. Patent Literature 1 discloses a radial gap type bearing-less motor in which an active supporting force of a rotor is generated in an axial direction.

CITATIONS LIST

Patent Literature

Patent Literature 1: JP 2014-121098 A

SUMMARY OF INVENTION

Technical Problems

In the bearing-less motor of Patent Literature 1, the coil is excited when the stator is energized, and a supporting force for floating the rotor in the axial direction is generated. Therefore, if the rotor is not arranged within a range of a predetermined position in the axial direction (floatable range) at the time of stator start, the supporting force exerted on the rotor becomes insufficient, and the rotor does not float. Since the floatable range of the rotor depends on an individual difference of the magnetic force of the magnet provided in the rotor, a winding state of the coil, and the like, it is difficult to manage quantitatively. In addition, when an attempt is made to mechanically position the rotor in order to dispose the rotor in the floatable range, interference between the rotor and the positioning portion may occur.

In view of the above circumstances, an object of the present invention is to provide a rotary electric machine capable of positioning a rotor within a floatable range by position adjustment.

Solutions to Problems

One aspect of a rotary electric machine with magnetic poles of the present invention includes: a rotor having a shaft extending in an axial direction with a central axis as the center and a plurality of rotor magnets arranged along a circumferential direction, the rotor rotating about the central axis; a stator having a coil and surrounding the rotor from a radially outer side; a housing that supports the stator; a pair of magnetic bearings respectively located on one side and the other side in the axial direction of the rotor magnet; and a position adjusting member held by the housing. The stator holds the rotor rotatably in the axial direction by a field current caused to flow through the coil. The magnetic bearing includes a cylindrical inner magnet fixed to the rotor and a cylindrical outer magnet fixed to the housing and surrounding the inner magnet, and holds the rotor rotatably in the radial direction. The rotor has a stepped surface facing the axial direction. The position adjusting member has an opposing surface facing the stepped surface, and is movable in the axial direction with respect to the housing.

Advantageous Effects of Invention

According to one aspect of the present invention, it is possible to provide a rotary electric machine capable of positioning a rotor within a floatable range by position adjustment.

DESCRIPTION OF EMBODIMENTS

In the following description, an axial direction of a central axis J, that is, a direction parallel to the vertical direction, is simply referred to as an "axial direction", a radial direction around the central axis J is simply referred to as a "radial direction", and a circumferential direction around the central axis J is simply referred to as a "circumferential direction". In the following embodiment, an upper side (+Z) corresponds to one side in the axial direction, and a lower side (−Z) corresponds to the other side in the axial direction. Note that the vertical direction, the upper side, and the lower side are simply names for describing a relative positional relationship of each portion, and an actual arrangement relationship or the like may be an arrangement relationship other than the arrangement relationships indicated by these names.

(Rotary Electric Machine)

Figure 1:
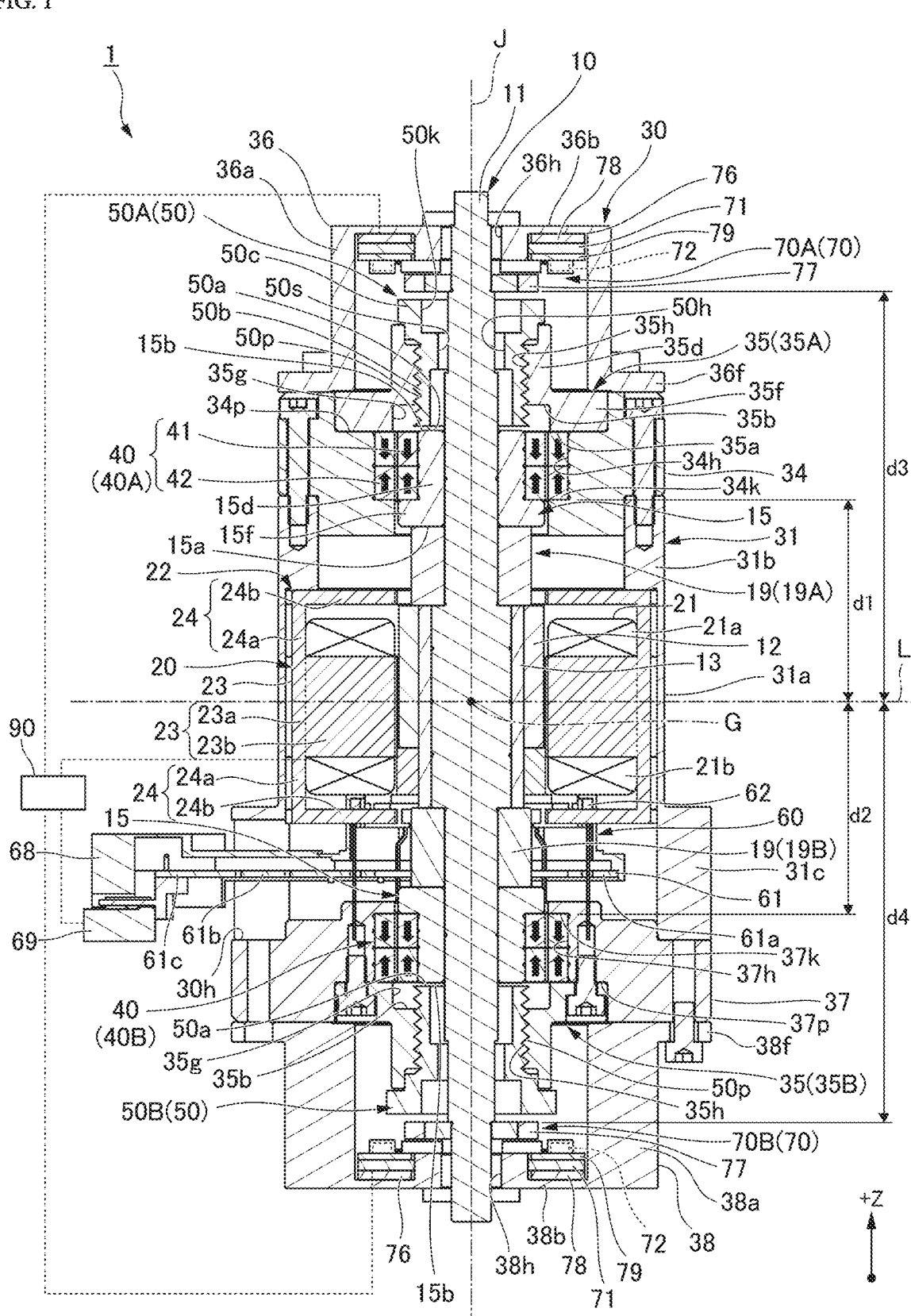
FIG. 1 is a schematic cross-sectional view of a rotary electric machine according to an embodiment.

FIG. 1 is a schematic cross-sectional view of a rotary electric machine 1 in a cross section taken along a central axis J.

The rotary electric machine 1 of the present embodiment includes a rotor 10, a stator 20, a pair of magnetic bearings 40, a pair of shoulder bolts (position adjusting members) 50, a rotation angle sensor 60, a pair of eccentricity sensors 70, a housing 30 that accommodates these components, and a control unit 90.

In the following description, one of the pair of eccentricity sensors 70 located on the upper side is referred to as an upper eccentric sensor (first eccentric sensor) 70A, and the other located on the lower side is referred to as a lower eccentric sensor (second eccentric sensor) 70B. Similarly, of the pair of shoulder bolts 50, one located on the upper side is referred to as an upper shoulder bolt 50A, and the other located on the lower side is referred to as a lower shoulder bolt 50B. Furthermore, of the pair of magnetic bearings 40, one located on the upper side is referred to as an upper magnetic bearing 40A, and the other located on the lower side is referred to as a lower magnetic bearing 40B. Note that the pair of eccentricity sensors 70 has the same form as each other. The pair of shoulder bolts 50 has the same form as each other. The pair of magnetic bearings 40 has the same form as each other.

(Stator)

The stator 20 has an annular shape centered on the central axis J. The rotor 10 is disposed radially inside the stator 20. That is, the stator 20 surrounds the rotor 10 from the radially outer side. The stator 20 includes a plurality of coils 21, a stator core 22, and an insulator (not illustrated).

The stator core 22 is formed of a plurality of electromagnetic steel sheets laminated along the axial direction. The stator core 22 includes a main core portion 23 and a pair of bearing core portions 24. One of the pair of bearing core portions 24 is disposed above the main core portion 23, and the other is disposed below the main core portion 23. The main core portion 23 mainly functions to generate a magnetic field that applies torque to the rotor 10. On the other hand, the bearing core portion 24 mainly functions to generate a magnetic field that holds the rotor 10 in the axial direction.

The main core portion 23 includes a core back portion 23*a* and a plurality of tooth portions 23*b*. The core back portion 23*a* has an annular shape centered on the central axis J. The outer peripheral surface of the core back portion 23*a* is fixed to the inner peripheral surface of the housing 30.

The tooth portion 23*b* extends radially inward from the radially inner surface of the core back portion 23*a*. The plurality of tooth portions 23*b* are arranged on the radially inner surface of the core back portion 23*a* at intervals in the circumferential direction. In the present embodiment, the plurality of tooth portions 23*b* are arranged at equal intervals in the circumferential direction. The coil 21 is attached to the tooth portion 23*b* via an insulating insulator (not illustrated).

The coil 21 is configured by winding a conductive wire around the tooth portion 23*b*. The rotary electric machine of the present embodiment is a three-phase AC motor. Therefore, the number of coils 21 is a multiple of 3. An alternating current whose phase is shifted every 120° flows through the plurality of coils. The number of phases of the coils is not limited to the number in the present embodiment.

The coil 21 has an upper coil end 21*a* and a lower coil end 21*b*. The upper coil end 21*a* is a part of the coil 21, and is a portion protruding upward from the upper end surface of the tooth portion 23*b*. Similarly, the lower coil end 21*b* is a part of the coil 21, and is a portion protruding downward from the lower end surface of the tooth portion 23*b*.

The bearing core portion 24 includes a bearing core back portion 24*a* and a plurality of bearing tooth portions 24*b*. The bearing core back portion 24*a* has the same shape as that of the bearing core back portion 24*a*, and overlaps the core back portion 23*a* of the main core portion 23 when viewed from the axial direction. The bearing core back portion 24*a* on the upper side of the main core portion 23 is disposed radially outside the upper coil end 21*a*. The bearing core back portion 24*a* on the lower side of the main core portion 23 is disposed radially outside the lower coil end 21*b*.

The bearing tooth portion 24*b* overlaps the tooth portion 23*b* when viewed from the axial direction. The bearing tooth portion 24*b* on the upper side of the main core portion 23 extends radially inward from the upper end portion of the bearing core back portion 24*a*. The bearing tooth portion 24*b* on the upper side of the main core portion 23 is located on the upper side of the upper coil end 21*a*. The bearing tooth portion 24*b* on the lower side of the main core portion 23 extends radially inward from the lower end portion of the bearing core back portion 24*a*. The bearing tooth portion 24*b* on the lower side of the main core portion 23 is located on the lower side of the lower coil end 21*b*.

(Rotor)

The rotor 10 rotates around the central axis J. The rotor 10 includes a shaft 11, a rotor core 13, a plurality of rotor magnets 12 arranged along the circumferential direction on the outer peripheral surface of the rotor core 13, a pair of spacers 19, and a pair of magnet pedestal portions 15.

The shaft 11 has a columnar shape extending in the axial direction with the central axis J as the center. The shaft 11 has a rotationally symmetric shape about the central axis J. On the outer peripheral surface of the shaft 11, a plurality of steps are arranged from the center in the axial direction toward the upper side and the lower side. The plurality of stepped surfaces are arranged symmetrically above and below the center of the shaft 11.

The rotor core 13 is fixed to an outer peripheral surface of the shaft 11. The rotor core 13 is disposed at the center in the axial direction of the shaft 11. A plurality of rotor magnets 12 are fixed to the outer peripheral surface of the rotor core 13.

The rotor magnet 12 is magnetized in the radial direction. The rotor magnet 12 is divided into two in the axial direction. That is, the rotor magnet 12 has two regions (upper region and lower region) divided vertically from each other. In the two regions divided from each other, directions of an N pole and an S pole (that is, magnetization directions) are reversed from each other. The upper region of the rotor magnet 12 has a larger axial dimension than the lower region. The upper region of the rotor magnet 12 faces the main core portion 23 and the upper coil end 21*a* in the radial direction. On the other hand, the lower region of the rotor magnet 12 faces the lower coil end 21*b* in the radial direction.

When an alternating current as a field current is caused to flow through the coil 21, a magnetic field that applies torque to the rotor 10 is formed between the stator 20 and the rotor 10. As a result, the stator 20 rotates the rotor 10 about the central axis J.

In addition, when the field current is caused to flow through the coil 21, a magnetic field that supports the rotor 10 in the axial direction is formed between the stator 20 and the rotor 10. More specifically, a magnetic field that attracts the upper region of the rotor magnet 12 facing in the radial direction is generated from the upper coil end 21*a* and the bearing tooth portion 24*b* located on the upper side of the upper coil end 21*a*. Furthermore, a magnetic field that attracts the lower region of the rotor magnet 12 facing in the radial direction is generated from the lower coil end 21*b* and the bearing tooth portion 24*b* located on the lower side of the lower coil end 21*b*. Thus, the stator 20 axially holds the rotor 10 in a rotatable manner. That is, the stator 20 of the present embodiment functions as an active magnetic bearing that generates an active supporting force to the rotor 10 by causing a current to flow through the coil 21.

The spacer 19 has a cylindrical shape centered on the central axis J. The spacers 19 are located on one side (upper side) and the other side (lower side) in the axial direction of the rotor core 13, respectively. The spacer 19 is inserted into the shaft 11. In the following description, when the pair of spacers 19 is distinguished, one disposed on the upper side may be referred to as an upper spacer 19A, and the other disposed on the lower side may be referred to as a lower spacer 19B.

The spacers 19 are disposed between the rotor core 13 and the magnet pedestal portion 15 on the upper side and the lower side of the rotor core 13, respectively. The spacers 19 maintain an axial distance between the rotor core 13 and the magnet pedestal portion 15.

A substrate 61 of the rotation angle sensor 60 is disposed radially outside the lower spacer 19B. In the lower spacer 19B, a space in which the substrate 61 is disposed is provided below the rotor core 13 and between the rotor core 13 and the magnet pedestal portion 15 in the axial direction.

According to the present embodiment, since the rotor 10 includes the pair of spacers 19, the position of the center of gravity G of the rotor 10 can be easily adjusted by changing the weight ratio of the respective spacers 19.

As a result, eccentric rotation of the rotor 10 can be suppressed. Further, by changing the axial dimension of each spacer 19, the axial position of a member attached to the rotor 10 on the outer side in the axial direction than the spacer 19 can be adjusted.

Regarding the rotor 10 of the present embodiment, the case where the spacers 19 are arranged one by one at one place has been described. However, a configuration may be adopted in which a plurality of types of spacers 19 having a small axial dimension are prepared, and a plurality of types of spacers 19 are stacked and arranged in the axial direction at one place. In this case, various kinds of combinations of the spacers 19 enable position adjustment in the axial direction.

The magnet pedestal portion 15 holds an inner magnet 41 of the magnetic bearing 40. The magnet pedestal portion 15 has an annular shape centered on the central axis J. The magnet pedestal portion 15 is inserted into the shaft 11. The inner peripheral surface of the magnet pedestal portion 15 is fixed to the outer peripheral surface of the shaft 11 with an adhesive or the like. Note that the magnet pedestal portion 15 may be fixed between a nut and a stepped surface of the shaft 11 by inserting the nut into a male screw provided on the shaft 11.

The magnet pedestal portion 15 includes a cylindrical magnet supporting cylindrical portion 15d and a flange portion 15f located at one end of the magnet supporting cylindrical portion 15d. The inner magnet 41 is fixed to the outer peripheral surface of the magnet supporting cylindrical portion 15d with an adhesive or the like. The flange portion 15f is in contact with one surface of the inner magnet 41 facing the axial direction. The flange portion 15f positions the inner magnet 41 in the axial direction with respect to the magnet pedestal portion 15.

One of the pair of magnet pedestal portions 15 on the upper side is located on the upper side of the upper spacer 19A and is in contact with the upper end surface of the upper spacer 19A. The other of the pair of magnet pedestal portions 15 on the lower side is located on the lower side of the lower spacer 19B and is in contact with the lower end surface of the lower spacer 19B. According to the present embodiment, the axial position of the inner magnet 41 of the magnetic bearing 40 can be adjusted by changing the axial dimensions of the upper spacer 19A and the lower spacer 19B. By adjusting the axial position of the inner magnet 41, the balance of the repulsive force acting with the outer magnet 42 can be adjusted, and the holding of the shaft 11 by the magnetic bearing 40 can be stabilized.

Here, one surface in contact with the spacer 19, of the pair of surfaces facing the axial direction of the magnet pedestal portion 15, is referred to as a contact surface 15a, and the other surface facing the opposite side is referred to as a stepped surface 15b. That is, the rotor 10 has the stepped surface 15b facing the axial direction.

The stepped surface 15b faces the shoulder bolt 50 in the axial direction. The rotor 10 of the present embodiment includes two magnet pedestal portions 15 located on one side and the other side in the axial direction of the rotor magnet 12, respectively. Therefore, the rotor 10 has the stepped surface 15b located on the upper side of the rotor magnet 12 and facing the upper side, and the stepped surface 15b located on the lower side of the rotor magnet 12 and facing the lower side.

(Magnetic Bearing)

The magnetic bearing 40 includes the inner magnet 41 and the outer magnet 42. Each of the inner magnet 41 and the outer magnet 42 has a tubular shape. The inner magnet 41 is fixed to the rotor 10. On the other hand, the outer magnet 42 is fixed to the housing 30. The outer magnet 42 surrounds the inner magnet 41 from the radially outer side.

The inner magnet 41 and the outer magnet 42 are each magnetized in the axial direction. The magnetization direction of the inner magnet 41 and the magnetization direction of the outer magnet 42 radially facing the inner magnet 41 coincide with each other.

In the present embodiment, one magnetic bearing 40 is provided with two inner magnets 41 arranged in the axial direction. The magnetization directions of the two inner magnets 41 are inverted from each other. Similarly, one magnetic bearing 40 is provided with two outer magnets 42 arranged in the axial direction, and the magnetization directions of these two outer magnets 42 are inverted from each other. In the present embodiment, the inner magnet 41 and the outer magnet 42 located on the upper side have an N pole on the upper side and an S pole on the lower side, and the inner magnet 41 and the outer magnet 42 located on the lower side have an S pole on the upper side and an N pole on the lower side.

The magnetic bearing 40 holds the rotor 10 rotatably in the radial direction by the inner magnet 41 and the outer magnet 42 repelling each other in the radial direction. As described above, the magnetic bearing 40 of the present embodiment is a passive magnetic bearing that holds the rotor 10 in the radial direction.

The magnetic bearings 40 of the present embodiment are disposed on one side and the other side in the axial direction of the rotor magnet 12, respectively. As a result, the pair of magnetic bearings 40 can hold the rotor 10 by the double-sided holding structure, so that the rotor 10 can be stably held.

FIG. 1 illustrates a center-of-gravity reference line L representing the axial position of the center of gravity G of the rotor 10. The center of gravity G of the rotor 10 is disposed at an intersection of the center-of-gravity reference line L and the central axis J. In the present embodiment, the magnetic bearings 40 are disposed on one side and the other side in the axial direction of the center of gravity G of the rotor 10, respectively. Therefore, the pair of magnetic bearings 40 can suppress eccentric rotation of the rotor 10.

In the present embodiment, an axial distance dimension d1 from the center of gravity G of the rotor 10 to the magnetic bearing 40 (upper magnetic bearing 40A) on one side in the axial direction is equal to an axial distance dimension d2 from the center of gravity G of the rotor 10 to the magnetic bearing 40 (lower magnetic bearing 40B) on the other side in the axial direction. When the rotor 10 eccentrically rotates, the rotor 10 eccentrically rotates so that the upper side and the lower side are symmetrical with respect to the center of gravity G. According to the present embodiment, by making the above-described distance dimensions d1 and d2 coincide with each other, when the rotor 10 eccentrically rotates, it is possible to make radial supporting forces exerted by the pair of magnetic bearings 40 on the rotor 10 coincide with each other and to make directions of the forces opposite to each other. Thus, the eccentricity of the rotor 10 can be reduced by the pair of magnetic bearings 40.

Here, the "center of gravity G of the rotor 10" means a center of gravity of a portion that rotates around the central axis J by the magnetic force from the stator 20. Although not illustrated in the present embodiment, the position of the center of gravity G is evaluated by including an output portion fixed to the end portion of the shaft 11 as a part of the rotor 10. As an example, when the rotary electric machine 1 is the power of a pump, the output portion fixed to the end portion of the shaft 11 is an impeller. In this case, the position of the center of gravity G of the rotor 10 is evaluated in a state where the impeller is attached to the shaft 11.

(Housing)

The housing 30 includes a housing main body 31, an upper magnet holding portion (magnet holding portion) 34, a lower magnet holding portion (magnet holding portion) 37, a pair of shoulder bolt holding portions (holding portions) 35, an upper cover (cover) 36, and a lower cover (cover) 38.

The upper magnet holding portion 34, the shoulder bolt holding portion 35, and the upper cover 36 are connected to the upper side of the housing main body 31. On the other hand, the lower magnet holding portion 37, the shoulder bolt holding portion 35, and the lower cover 38 are connected to the lower side of the housing main body 31.

The housing main body 31 has a tubular shape that is open in the vertical direction. The housing main body 31 includes a stator holding portion 31*a*, an upper connecting portion 31*b* located above the stator holding portion 31*a*, and a lower connecting portion 31*c* located below the stator holding portion 31*a*.

The stator holding portion 31*a* has a tubular shape centered on the central axis J. The stator holding portion 31*a* surrounds the stator core 22 from the radially outer side. Thus, the housing supports the stator 20. The upper magnet holding portion 34 is connected to the upper connecting portion 31*b*.

The upper magnet holding portion 34 has an annular shape centered on the central axis J. The upper magnet holding portion 34 is screwed to the upper connecting portion 31*b* of the housing main body 31 from above.

The upper magnet holding portion 34 is provided with a flange housing recess 34*p* recessed downward from the upper surface, and a magnet holding hole 34*h* opened on the bottom surface of the flange housing recess 34*p*. The flange housing recess 34*p* opens upward. The flange housing recess 34*p* has a circular shape centered on the central axis J when viewed from the axial direction.

The magnet holding hole 34*h* of the upper magnet holding portion 34 is a through hole extending in the axial direction with the central axis J as the center. The shaft 11 is inserted into the magnet holding hole 34*h*. The outer magnet 42 of the upper magnetic bearing 40A is fixed to the inner peripheral surface of the magnet holding hole 34*h* with an adhesive. Thus, the upper magnet holding portion 34 holds the outer magnet 42. A magnet support surface 34*k* facing upward is provided on the inner peripheral surface of the magnet holding hole 34*h*. The magnet support surface 34*k* is in contact with the lower surface of the outer magnet 42. When the outer magnet 42 comes into contact with the magnet support surface 34*k*, the outer magnet 42 is positioned in the axial direction with respect to the housing 30.

The lower magnet holding portion 37 has an annular shape centered on the central axis J. The lower magnet holding portion 37 is screwed to the lower connecting portion 31*c* of the housing main body 31 from below.

The lower magnet holding portion 37 is provided with a flange housing recess 37*p* recessed upward from the lower surface, and a magnet holding hole 37*h* opened in the bottom surface of the flange housing recess 37*p*. The flange housing recess 37*p* opens downward. The flange housing recess 37*p* has a circular shape centered on the central axis J when viewed from the axial direction.

The magnet holding hole 37*h* of the lower magnet holding portion 37 is a through hole extending in the axial direction with the central axis J as the center. The shaft 11 is inserted into the magnet holding hole 37*h*. The outer magnet 42 of the lower magnetic bearing 40B is fixed to the inner peripheral surface of the magnet holding hole 37*h* with an adhesive. As a result, the lower magnet holding portion 37 holds the outer magnet 42. A magnet support surface 37*k* facing downward is provided on the inner peripheral surface of the magnet holding hole 37*h*. The magnet support surface 37*k* is in contact with the upper surface of the outer magnet 42. When the outer magnet 42 comes into contact with the magnet support surface 37*k*, the outer magnet 42 is positioned in the axial direction with respect to the housing 30.

A through hole 30*h* penetrating radially inward and outward is provided between the lower magnet holding portion 37 and the housing main body 31. Inside the through hole 30*h*, an extending portion 61*b* that is a part of the substrate 61 of the rotation angle sensor 60 is disposed.

One of the pair of shoulder bolt holding portions 35 is fixed to the upper magnet holding portion 34, and the other is fixed to the lower magnet holding portion 37. The pair of shoulder bolt holding portions 35 has the same form as each other.

The shoulder bolt holding portion 35 includes a nut portion 35*d* and a fixed flange portion 35*f* located at one axial end of the nut portion 35*d*. The nut portion 35*d* has a cylindrical shape centered on the central axis J. That is, the nut portion 35*d* extends in the axial direction with the central axis J as the center. The nut portion 35*d* has a screw hole 35*h* in which a female screw is provided on the inner peripheral surface. The shoulder bolt 50 is inserted into the screw hole 35*h* of the nut portion 35*d*. Thus, the shoulder bolt holding portion 35 holds the shoulder bolt 50. That is, the shoulder bolt holding portion 35 is held by the housing 30.

In the following description, one of the pair of shoulder bolt holding portions 35 located on the upper side may be referred to as an upper shoulder bolt holding portion 35A, and the other located on the lower side may be referred to as a lower shoulder bolt holding portion 35B.

In the upper shoulder bolt holding portion 35A, the fixed flange portion 35*f* extends radially outward from the lower end portion of the nut portion 35*d*. On the other hand, in the lower shoulder bolt holding portion 35B, the fixed flange portion 35*f* extends radially outward from the upper end portion of the nut portion 35*d*.

The fixed flange portion 35*f* of the upper shoulder bolt holding portion 35A is screwed to the upper magnet holding portion 34 from above. That is, the upper shoulder bolt holding portion 35A is fixed to the upper magnet holding portion 34. The fixed flange portion 35*f* of the upper shoulder bolt holding portion 35A is disposed in the flange housing recess 34*p* of the upper magnet holding portion 34.

On the other hand, the fixed flange portion 35*f* of the lower shoulder bolt holding portion 35B is screwed to the lower magnet holding portion 37 from below. That is, the lower shoulder bolt holding portion 35B is fixed to the lower magnet holding portion 37. The fixed flange portion 35*f* of the lower shoulder bolt holding portion 35B is disposed in the flange housing recess 37p of the lower magnet holding portion 37.

The upper shoulder bolt holding portion 35A covers at least a part of the upper end surface (end surface facing the axial direction) of the outer magnet 42 of the upper magnetic bearing 40A in the fixed flange portion 35f. Similarly, the lower shoulder bolt holding portion 35B covers at least a part of the lower end surface (end surface facing the axial direction) of the outer magnet 42 of the lower magnetic bearing 40B in the fixed flange portion 35f. Therefore, the upper shoulder bolt holding portion 35A and the lower shoulder bolt holding portion 35B suppress separation of the outer magnet 42 in the axial direction.

The lower surface of the fixed flange portion 35f is provided with a recess 35g that opens in the axial direction. The recess 35g has a bottom surface (gap facing surface) 35b. The bottom surface 35b of the recess 35g faces the inner magnet 41 in the axial direction with a gap interposed therebetween. By providing the recess 35g in the fixed flange portion 35f, a gap is provided between the fixed flange portion 35f and the inner magnet 41, and interference between the fixed flange portion 35f and the inner magnet 41 is suppressed.

The recess 35g has a circular shape centered on the central axis J when viewed from the axial direction. The recess 35g of the upper shoulder bolt holding portion 35A opens downward, and the recess 35g of the lower shoulder bolt holding portion 35B opens upward. The bottom surface 35b of the recess 35g of the upper shoulder bolt holding portion 35A faces downward, and the bottom surface 35b of the recess 35g of the lower shoulder bolt holding portion 35B faces upward. The screw hole 35h of the nut portion 35d is opened in the bottom surface 35b.

The upper cover 36 is located on the upper side of the upper magnet holding portion 34. The upper cover 36 has a tubular shape centered on the central axis J. The upper cover 36 includes an upper cover cylindrical portion 36a, an upper cover bottom portion 36b, and an upper cover flange portion 36f.

The upper cover cylindrical portion 36a has a cylindrical shape extending in the axial direction with the central axis J as the center. The upper cover bottom portion 36b extends radially inward from the upper end of the upper cover cylindrical portion 36a. The upper cover cylindrical portion 36a has a plate shape along a plane orthogonal to the central axis J. A shaft insertion hole 36h through which the shaft 11 is inserted is provided at the center of the upper cover cylindrical portion 36a.

The upper cover flange portion 36f extends radially outward from the lower end of the upper cover cylindrical portion 36a. The upper cover flange portion 36f is screwed to the upper magnet holding portion 34. A part of the upper cover flange portion 36f overlaps the fixed flange portion 35f arranged in the flange housing recess 34p.

According to the present embodiment, the upper shoulder bolt holding portion 35A is sandwiched between the upper magnet holding portion 34 and the upper cover 36 in the axial direction. Therefore, the shoulder bolt holding portion 35 is more reliably held by the upper magnet holding portion 34 and the upper cover 36. Further, by adjusting the dimension of the shoulder bolt holding portion 35, it is also possible to adopt a fixing structure for fixing the shoulder bolt holding portion 35 to the upper magnet holding portion 34 without using a screw.

The lower cover 38 is located below the lower magnet holding portion 37. The lower cover 38 has a tubular shape centered on the central axis J. The lower cover 38 includes a lower cover cylindrical portion 38a, a lower cover bottom portion 38b, and a lower cover flange portion 38f.

The lower cover cylindrical portion 38a has a cylindrical shape extending in the axial direction with the central axis J as the center. The lower cover bottom portion 38b extends radially inward from the lower end of the lower cover cylindrical portion 38a. The lower cover cylindrical portion 38a has a plate shape along a plane orthogonal to the central axis J. A shaft insertion hole 38h through which the shaft 11 is inserted is provided at the center of the lower cover cylindrical portion 38a.

The lower cover flange portion 38f extends radially outward from the lower end of the lower cover cylindrical portion 38a. The lower cover flange portion 38f is screwed to the lower magnet holding portion 37. A part of the lower cover flange portion 38f overlaps the fixed flange portion 35f arranged in the flange housing recess 37p. That is, the shoulder bolt holding portion 35 is sandwiched between the lower magnet holding portion 37 and the lower cover 38 in the axial direction. Therefore, the lower shoulder bolt holding portion 35B is reliably held by the lower magnet holding portion 37 and the lower cover 38, similarly to the upper shoulder bolt holding portion 35A.

The upper cover 36 and the lower cover 38 cover the eccentricity sensor 70 and the shoulder bolt 50, respectively. As a result, the upper cover 36 and the lower cover 38 can protect the eccentricity sensor 70 and the shoulder bolt 50, and suppress damage caused by collision with other members. In addition, the upper cover 36 and the lower cover 38 can suppress the shoulder bolt 50 from coming into contact with other members and moving in the axial direction. The operation of the shoulder bolt 50 is performed by removing the upper cover 36 and the lower cover 38.

(Shoulder Bolt (Position Adjusting Member))

The shoulder bolt 50 has a shaft portion 50b and a head portion 50c. The shaft portion 50b extends in the axial direction about the central axis J. A male screw 50p is provided on the outer peripheral surface of the shaft portion 50b. The male screw 50p is inserted into the screw hole 35h of the shoulder bolt holding portion 35. Thus, the shoulder bolt 50 is held by the shoulder bolt holding portion 35. The shoulder bolt 50 axially moves with respect to the shoulder bolt holding portion 35 by rotating the shaft portion 50b.

The head portion 50c is disposed at one end of the shaft portion 50b. The head portion 50c extends in a flange shape radially outward from the outer peripheral surface of the shaft portion 50b. The outer peripheral surface of the head portion 50c has a hexagonal shape when viewed from the axial direction. The head portion 50c is provided to rotate the shoulder bolt 50 using a spanner or the like.

The shoulder bolt 50 has an opposing surface 50a located at the tip of the head portion 50c and facing the axial direction. The opposing surface 50a of the upper shoulder bolt 50A faces downward. On the other hand, the opposing surface 50a of the lower shoulder bolt 50B faces upward. The opposing surface 50a faces the stepped surface 15b of the rotor 10 in the axial direction.

The rotor 10 of the present embodiment is held in the axial direction with respect to the stator 20 by causing a field current to flow through the coil 21 of the stator 20. The rotor 10 is not held in the axial direction before the rotary electric machine 1 is started. Therefore, the rotor 10 is supported in a state of being biased to one side in the axial direction by the magnetic force of the magnetic bearing 40 and the gravity. The rotor 10 before being started is supported by the housing 30 in either a state where the upper stepped surface 15$b$ is in contact with the opposing surface 50$a$ of the upper shoulder bolt 50A or a state where the lower stepped surface 15$b$ is in contact with the opposing surface 50$a$ of the lower shoulder bolt 50B.

The shoulder bolt 50 of the present embodiment moves in the axial direction with respect to the housing 30 by being rotated. In the rotary electric machine 1 before being started, when one shoulder bolt 50 in contact with the stepped surface 15$b$ of the rotor 10 is moved in the axial direction, the rotor 10 moves in the axial direction together with the shoulder bolt 50.

If the rotor 10 is not disposed within a range of a specific position (floatable range) in the axial direction, the supporting force applied from the stator 20 to the rotor 10 at the time of start cannot float the rotor 10.

According to the present embodiment, the rotor 10 can be moved to be in the floatable range by moving the shoulder bolt 50. That is, the position before the start of the rotor 10 can be adjusted according to the individual difference of the magnetic force of the rotor magnet 12, and the rotary electric machine 1 can be smoothly started regardless of the individual difference of the rotor magnet 12.

The floatable range of the rotor 10 is mainly determined by an individual difference of the magnetic force of the rotor magnet 12. For this reason, the position before the start of the rotor 10 by the shoulder bolt 50 does not need to be readjusted in principle after being adjusted once. However, when demagnetization occurs in the rotor magnet 12 depending on the use environment of the rotary electric machine 1, for example, readjustment is required.

According to the present embodiment, by adopting the shoulder bolt 50 as a position adjusting member, the position of the rotor 10 before the start can be easily performed by the rotation of the shoulder bolt 50. According to the present embodiment, since the position of the rotor 10 can be adjusted only by rotating the shoulder bolt 50, even when readjustment is necessary, an operator can easily perform the readjustment.

In the present embodiment, the case where the shoulder bolt 50 that moves in the axial direction by the screw mechanism is adopted as a position adjusting member has been described. However, the position adjusting member may have another configuration. For example, a member that adjusts the position in the axial direction by sandwiching the shim may be adopted as a position adjusting member.

According to the rotary electric machine 1 of the present embodiment, the shoulder bolts 50 are located on one side (upper side) and the other side (lower side) in the axial direction of the rotor magnet 12, respectively. The pair of shoulder bolts 50 has opposing surfaces 50$a$ facing opposite sides in the axial direction. That is, according to the present embodiment, the upper end position and the lower end position of the floatable range can be adjusted by the pair of shoulder bolts 50. For this reason, the rotary electric machine 1 can be smoothly started even when the rotor 10 before being started is biased in either one direction or the other direction in the axial direction.

In addition, according to the present embodiment, when the gap between the opposing surface 50$a$ of the other shoulder bolt 50 and the stepped surface 15$b$ of the rotor 10 is extremely narrowed due to the position adjustment of the rotor 10 by one shoulder bolt 50, it is possible to secure a sufficiently wide gap by adjusting the other shoulder bolt 50. As a result, interference between the shoulder bolt 50 and the rotor 10 can be reliably suppressed, so that smooth rotation of the rotor 10 can be secured.

According to the present embodiment, the shoulder bolt 50 protrudes downward from the bottom surface 35$b$ of the recess 35$g$ provided in the shoulder bolt holding portion 35. According to the present embodiment, since the recess 35$g$ is provided in the shoulder bolt holding portion 35, a gap can be provided between the bottom surface 35$b$ and the stepped surface 15$b$ of the rotor 10 to secure an adjustment margin of the shoulder bolt holding portion 35.

The shoulder bolt 50 is provided with a central hole 50$h$ penetrating in the axial direction. The central hole 50$h$ extends in the axial direction about the central axis J. The shaft 11 passes through the central hole 50$h$. The central hole 50$h$ is provided with a small diameter portion 50$s$ having a small inner diameter at the axial center of the shoulder bolt. The gap between the inner peripheral surface of the central hole 50$h$ and the outer peripheral surface of the shaft 11 is the narrowest in the small diameter portion 50$s$.

According to the present embodiment, since the shaft 11 passes through the central hole 50$h$ of the shoulder bolt 50, it is possible to suppress the inclination of the shaft 11 from becoming too large due to the interference between the inner surface of the central hole 50$h$ and the shaft 11. As a result, even when eccentricity occurs in the shaft 11, interference between the rotor magnet 12 and the stator 20, interference between the inner magnet 41 and the outer magnet 42 in the magnetic bearing 40, and the like can be suppressed.

The central hole 50$h$ of the present embodiment narrows the gap with the shaft 11 in the small diameter portion 50$s$. Therefore, the inclination of the shaft 11 can be more effectively suppressed. Furthermore, the gap between the inner peripheral surface of the small diameter portion 50$s$ and the outer peripheral surface of the shaft 11 may be narrower than the gap between the inner magnet 41 and the outer magnet 42 of the magnetic bearing 40. In this case, interference between the inner magnet 41 and the outer magnet 42 can be more reliably suppressed.

The central hole 50$h$ of the present embodiment is provided with a large-diameter opening 50$k$ that increases the inner diameter on one side in the axial direction. The large-diameter opening 50$k$ has a circular shape centered on the central axis J when viewed from the axial direction.

(Rotation Angle Sensor)

The rotation angle sensor 60 is located below the stator 20. The rotation angle sensor 60 detects the magnetic field of the rotor magnet 12 and measures the rotation angle of the rotor 10.

The rotation angle sensor 60 includes a substrate 61 extending along a plane orthogonal to the central axis J, a plurality of (six in the present embodiment) magnetic field detection elements (magnetic field detectors) 62 mounted on the substrate, a sensor holder 68 that covers and protects the substrate 61 and the magnetic field detection elements 62, and a connector 69 to which a harness terminal is connected.

Figure 2:
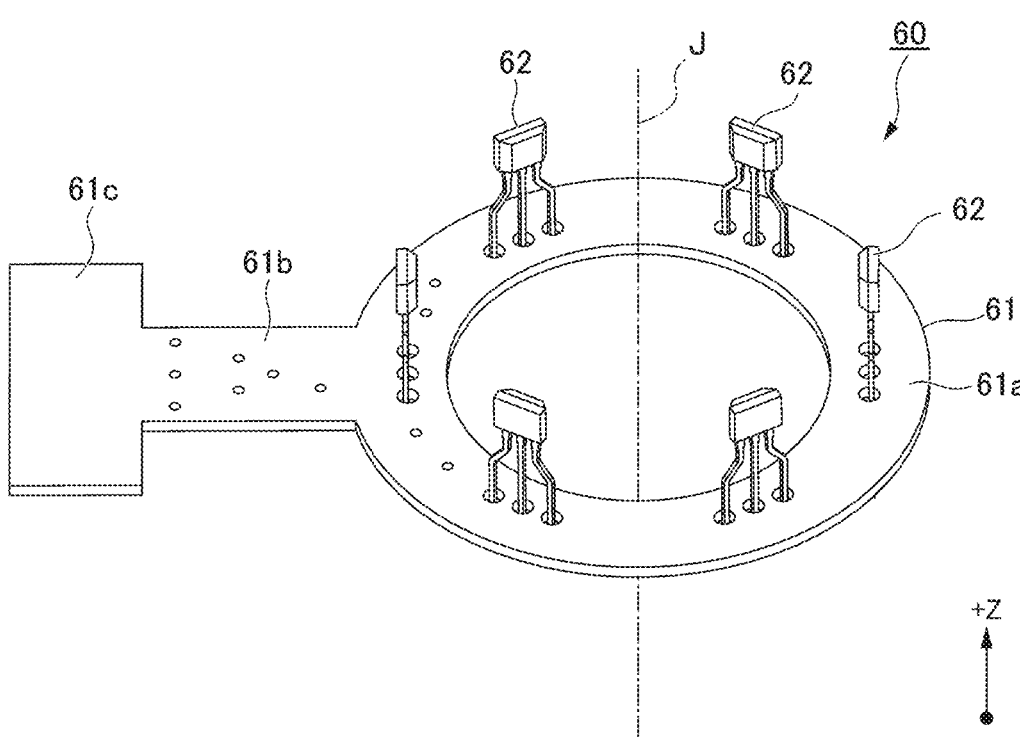
FIG. 2 is a perspective view of a rotation angle sensor according to an embodiment.

FIG. 2 is a perspective view of the rotation angle sensor 60. In FIG. 2, illustration of the sensor holder 68 and the connector 69 is omitted.

The substrate 61 includes an annular portion 61$a$ having an annular shape centered on the central axis J, an extending portion 61$b$ extending radially outward from an outer edge of the annular portion 61$a$, and a terminal arrangement portion 61$c$ located at the tip of the extending portion 61$b$. The annular portion 61$a$ surrounds the shaft 11 from the radially outer side. Six magnetic field detection elements 62 are mounted on the annular portion 61$a$.

As illustrated in FIG. 1, the annular portion 61$a$ is disposed inside the housing 30. The extending portion 61$b$ of the substrate 61 is disposed in the through hole 30$h$ penetrating the outer peripheral surface of the housing 30. Therefore, the extending portion 61b extends across the inside and the outside of the housing 30. Further, the terminal arrangement portion 61c is arranged outside the housing 30. The connector 69 is mounted on the terminal arrangement portion 61c.

The magnetic field detection element 62 is, for example, a Hall element. The magnetic field detection element 62 is mounted on the upper surface of the substrate 61. The magnetic field detection element 62 extends from the substrate 61 toward the rotor magnet 12 side (that is, the upper side) in the axial direction. The six magnetic field detection elements 62 of the present embodiment are arranged at equal intervals along the circumferential direction. Tip ends of the respective magnetic field detection elements 62 are arranged between the bearing tooth portions 24b arranged along the circumferential direction. The magnetic field detection element 62 faces the lower region of the rotor magnet 12 in the radial direction. Each magnetic field detection element 62 detects the magnetic field of the rotor magnet 12.

According to the rotation angle sensor 60 of the present embodiment, the rotation angle of the rotor 10 is measured based on a change in the magnetic field of the rotor magnet 12. Therefore, it is not necessary to separately prepare a magnet for detecting the rotation angle, and the number of parts can be reduced.

In the rotation angle sensor 60 of the present embodiment, the magnetic field detection element 62 extends toward the rotor magnet 12 side. Therefore, the magnetic field detection element 62 can be brought close to the rotor magnet 12, and the detection accuracy of the rotation angle sensor 60 can be enhanced.

(Eccentric Sensor)

An upper eccentricity sensor 70A is located above the rotor magnet 12. The upper eccentricity sensor 70A is disposed near the upper end of the shaft 11. On the other hand, a lower eccentricity sensor 70B is located below the rotor magnet 12. The lower eccentricity sensor 70B is disposed near the lower end of the shaft 11.

The upper eccentricity sensor 70A and the lower eccentricity sensor 70B detect radial displacements of the upper end and the lower end of the shaft 11. That is, the upper eccentricity sensor 70A and the lower eccentricity sensor 70B measure the eccentricity of the shaft 11.

The eccentricity sensor 70 includes a sensor magnet 77 fixed to the rotor 10, and a sensor main body 76 fixed to the housing 30. The sensor magnet 77 and the sensor main body 76 face each other in the axial direction. In the upper eccentricity sensor 70A, the sensor main body 76 is located above the sensor magnet 77 and is fixed to the upper cover bottom portion 36b. In the lower eccentricity sensor 70B, the sensor main body 76 is located below the sensor magnet 77 and is fixed to the lower cover bottom portion 38b.

The sensor main body 76 includes a sensor substrate 71, a plurality of (four in the present embodiment) magnetic field detection elements (magnetic field detectors) 72, a first sensor cover 78, a second sensor cover 79, and a connector (not illustrated) to which a harness terminal is connected. The sensor substrate 71 extends along a plane orthogonal to the central axis J. The magnetic field detection element 72 is mounted on the sensor substrate 71. The first sensor cover 78 covers and protects one surface of the sensor substrate 71. The second sensor cover 79 covers and protects the other surface of the sensor substrate 71 and the magnetic field detection element 72.

The sensor magnet 77 is fixed to the shaft 11. The sensor magnet 77 rotates around the central axis J together with the shaft 11. The sensor magnet 77 of the upper eccentricity sensor 70A is located at the upper end of the shaft 11 and above the upper shoulder bolt 50A. The sensor magnet 77 of the lower eccentricity sensor 70B is located at the lower end of the shaft 11 and below the lower shoulder bolt 50B.

Figure 3:
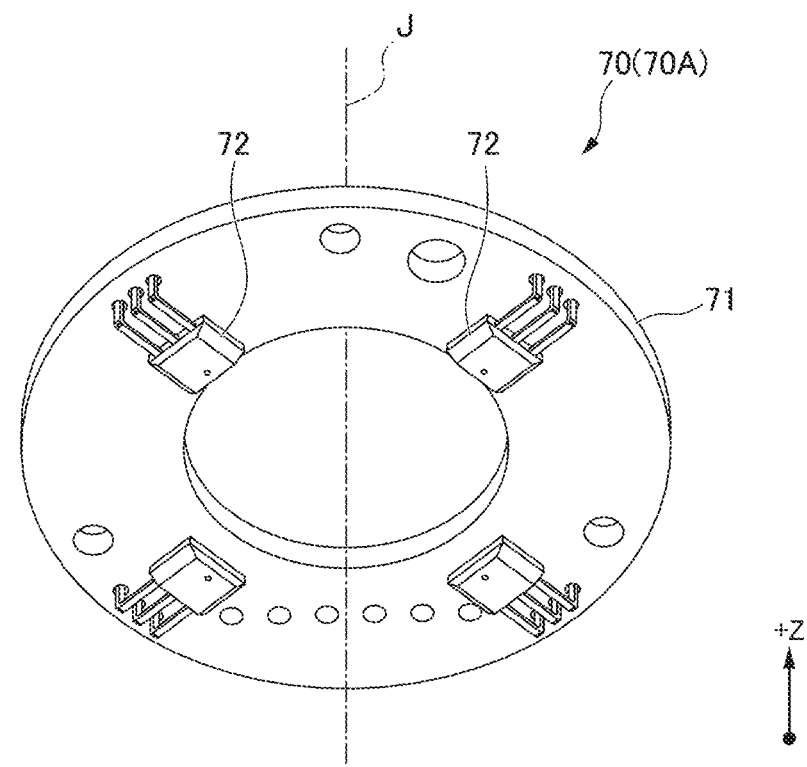
FIG. 3 is a perspective view of an eccentric sensor according to an embodiment.

FIG. 3 is a perspective view of the eccentricity sensor 70. In FIG. 3, illustration of the first sensor cover 78 and the second sensor cover 79 is omitted.

The sensor substrate 71 has an annular shape centered on the central axis J when viewed from the axial direction. The sensor substrate 71 surrounds the shaft 11 from the radially outer side.

The magnetic field detection element 72 is fixed to the housing 30 via the sensor substrate 71. The magnetic field detection element 72 is, for example, a Hall element. The magnetic field detection element 72 of the upper eccentricity sensor 70A is mounted on the lower surface of the sensor substrate 71. On the other hand, the magnetic field detection element 72 of the lower eccentricity sensor 70B is mounted on the upper surface of the sensor substrate 71.

The four magnetic field detection elements 72 of the present embodiment are arranged at equal intervals along the circumferential direction. The magnetic field detection element 72 faces the sensor magnet 77 in the axial direction. The magnetic field detection element 72 detects the magnetic field of the sensor magnet 77. Since the eccentricity sensor 70 of the present embodiment includes the four magnetic field detection elements 72, the eccentricity of the shaft 11 can be measured with high accuracy.

According to the rotary electric machine 1 of the present embodiment, the eccentricity sensor 70 is disposed on each of one side and the other side in the axial direction of the rotor magnet 12. According to the present embodiment, not only the positional deviation of the shaft 11 with respect to the central axis J but also the inclination of the shaft 11 can be three-dimensionally measured using the pair of eccentricity sensors 70.

In the present embodiment, an axial distance dimension d3 from the center of gravity G of the rotor 10 to the upper eccentricity sensor 70A and an axial distance dimension d4 from the center of gravity G of the rotor 10 to the lower eccentricity sensor 70B are equal to each other. According to the present embodiment, the measurement result of the eccentricity amount of the shaft 11 in the upper eccentricity sensor 70A and the measurement result of the eccentricity amount of the shaft 11 in the lower eccentricity sensor 70B can be handled equivalently. According to the present embodiment, control for eliminating eccentricity of the rotor 10 is facilitated.

(Control Unit)

The control unit 90 is electrically connected to the stator 20, the rotation angle sensor 60, the upper eccentricity sensor 70A, and the lower eccentricity sensor 70B. Furthermore, the control unit 90 is connected to a power supply (not illustrated).

The control unit 90 and the stator 20 are connected by a power supply line. On the other hand, the control unit 90, the rotation angle sensor 60, the upper eccentricity sensor 70A, and the lower eccentricity sensor 70B are connected by signal lines. The control unit 90 controls the stator 20 on the basis of the measurement results received from the rotation angle sensor 60, the upper eccentricity sensor 70A, and the lower eccentricity sensor 70B.

The control unit 90 includes an inverter that converts the current supplied from the power supply into three-phase alternating current. The control unit 90 the control unit 90 controls the alternating current flowing through the coil 21 on the basis of the measurement result of the rotation angle of the rotor 10 in the rotation angle sensor 60. More specifically, the rotation speed of the rotor 10 is calculated from the measurement result of the rotation angle of the rotor 10, and the frequency of the alternating current flowing to the coil 21 is controlled.

In addition, the control unit 90 controls the field current flowing to the coil 21 on the basis of the measurement results of the eccentricity of the rotor 10 by the upper eccentricity sensor 70A and the lower eccentricity sensor 70B to suppress the eccentric rotation of the rotor 10. That is, the amplitude, frequency, and the like of the alternating current flowing through the coil 21 are adjusted according to the amount of eccentricity, and eccentricity that cancels the eccentricity of the rotor 10 is generated in the rotor 10. As a result, the control unit 90 suppresses the eccentricity of the rotor 10. This makes it possible to enhance the rotation efficiency of the rotor 10. In addition, interference between the rotor 10 and the stator 20 due to eccentricity of the rotor 10 and interference between the inner magnet 41 and the outer magnet 42 of the magnetic bearing 40 can be suppressed, and reliability of the rotary electric machine 1 can be enhanced.

According to the present embodiment, the rotary electric machine 1 includes the eccentricity sensor 70 connected to the control unit 90. The control unit 90 can monitor the eccentricity of the rotor 10 by monitoring the state of eccentricity of the rotor 10 by the eccentricity sensor 70. As a result, when the amount of eccentricity of the rotor 10 becomes too large, it is also possible to perform control such as stopping the current flowing to the coil 21 to stop the rotation of the rotor 10. As a result, it is possible to suppress interference of each part due to eccentricity of the rotor 10, and to enhance reliability of the rotary electric machine 1.

Although the embodiment of the present invention and the modifications thereof have been described above, the respective configurations and combinations thereof in the embodiment and the modifications are merely examples, and therefore addition, omission, substation, and other variations of the configurations can be made within the scope not departing from the gist of the present invention. Further, the present invention is not to be limited by the embodiment and the modification thereof.

The invention claimed is:

1. A rotary electric machine comprising:
a rotor having a shaft extending in an axial direction with a central axis as a center and a plurality of rotor magnets arranged along a circumferential direction, the rotor rotating about the central axis;
a stator including a coil and surrounding the rotor from a radially outer side;
a housing that supports the stator;

a pair of magnetic bearings respectively located on one side and another side in the axial direction of the rotor magnet; and
a position adjusting member held by the housing, wherein the stator rotatably holds the rotor in the axial direction by a field current caused to flow through the coil,
the pair of magnetic bearings each include an inner magnet having a cylindrical shape and fixed to the rotor and an outer magnet having a cylindrical shape and fixed to the housing and surrounding the inner magnet, and rotatably hold the rotor in a radial direction,
the rotor has a stepped surface facing the axial direction, and
the position adjusting member has an opposing surface facing the stepped surface, and is movable in the axial direction with respect to the housing.

2. The rotary electric machine according to claim 1, further comprising
a pair of the position adjusting members, wherein
the pair of position adjusting members are respectively located on the one side and the other side in the axial direction of the rotor magnet, and have the opposing surfaces facing opposite sides in the axial direction.

3. The rotary electric machine according to claim 1, wherein
the housing includes a holding portion that holds the position adjusting member,
the holding portion includes a nut portion extending in the axial direction with the central axis as a center, and
a male screw to be inserted into the nut portion is provided on an outer peripheral surface of the position adjusting member.

4. The rotary electric machine according to claim 3, wherein the holding portion covers at least a part of an end surface facing the axial direction of the outer magnet.

5. The rotary electric machine according to claim 3, wherein
the holding portion has a gap facing surface axially facing the inner magnet via a gap, and
the position adjusting member protrudes from the gap facing surface in the axial direction.

6. The rotary electric machine according to claim 3, wherein
the housing includes:
a magnet holding portion that holds the outer magnet; and
a cover that covers the position adjusting member, and
the holding portion is sandwiched between the magnet holding portion and the cover in the axial direction.

7. The rotary electric machine according to claim 1, wherein the position adjusting member is provided with a central hole penetrating in the axial direction with the central axis as a center, and the shaft passes through the central hole.

* * * * *